(12) United States Patent
Fujii et al.

(10) Patent No.: US 11,688,095 B2
(45) Date of Patent: Jun. 27, 2023

(54) TIPTOE POSITION ESTIMATING DEVICE AND FINGERTIP POSITION ESTIMATING DEVICE

(71) Applicant: AISIN CORPORATION, Aichi (JP)

(72) Inventors: Hiroyuki Fujii, Kariya (JP); Takahiro Izuno, Kariya (JP); Masahiro Takeuchi, Kariya (JP)

(73) Assignee: AISIN CORPORATION, Kariya (JP)

( * ) Notice: Subject to any disclaimer, the term of this patent is extended or adjusted under 35 U.S.C. 154(b) by 244 days.

(21) Appl. No.: 17/072,197

(22) Filed: Oct. 16, 2020

(65) Prior Publication Data

US 2021/0118170 A1    Apr. 22, 2021

(30) Foreign Application Priority Data

Oct. 18, 2019  (JP) ................................ 2019-191471

(51) Int. Cl.
G06T 7/73    (2017.01)

(52) U.S. Cl.
CPC ...... G06T 7/73 (2017.01); *G06T 2207/30196* (2013.01); *G06T 2207/30268* (2013.01)

(58) Field of Classification Search
CPC ............. G06T 7/73; G06T 2207/30196; G06T 2207/30268
See application file for complete search history.

(56) References Cited

U.S. PATENT DOCUMENTS

| 10,296,785 | B1 * | 5/2019 | Chan ...................... G06V 40/20 |
| 10,723,198 | B2 * | 7/2020 | Freese ................ B60H 1/00871 |
| 2008/0021616 | A1 * | 1/2008 | Aoki ................. B60R 21/01538 701/45 |
| 2011/0175843 | A1 * | 7/2011 | Bachfischer ........... B60K 37/06 345/173 |
| 2017/0088029 | A1 * | 3/2017 | Mizoi ..................... B60N 2/665 |
| 2017/0315551 | A1 * | 11/2017 | Mimura ................ B60W 50/08 |
| 2018/0056750 | A1 * | 3/2018 | Freese ................ B60H 1/00871 |
| 2019/0354835 | A1 * | 11/2019 | Mac ........................ G06N 3/048 |
| 2020/0098134 | A1 * | 3/2020 | Fujimoto ............. H04N 13/296 |

FOREIGN PATENT DOCUMENTS

| JP | 2002-352231 A | | 12/2002 |
| JP | 2011200394 A | * | 10/2011 |
| JP | 2016-162425 A | | 9/2016 |
| JP | 2018-116397 A | | 7/2018 |

\* cited by examiner

*Primary Examiner* — Shaghayegh Azima
(74) *Attorney, Agent, or Firm* — Oblon, McClelland, Maier & Neustadt, L.L.P.

(57) ABSTRACT

A tiptoe position estimating device includes: a camera configured to capture an image of an interior of a vehicle; and a human body information acquisition unit configured to acquire, from a captured image obtained by capturing an image of a person seated on a seat in the interior by the camera, position information of skeleton points at a plurality of positions of a body of the person. The human body information acquisition unit is configured to acquire thigh information which is position information of a skeleton point of a thigh of the person, and lower leg information which is position information of a skeleton point of a lower leg of the person. The human body information acquisition unit includes a tiptoe position estimating part configured to estimate a tiptoe position of a foot of the person based on the acquired thigh information and the acquired lower leg information.

4 Claims, 5 Drawing Sheets

TIPTOE POSITION ESTIMATING DEVICE AND FINGERTIP POSITION ESTIMATING DEVICE

CROSS REFERENCE TO RELATED APPLICATIONS

This application is based on and claims priority under 35 U.S.C. § 119 to Japanese Patent Application 2019-191471, filed on Oct. 18, 2019, the entire content of which is incorporated herein by reference.

TECHNICAL FIELD

This disclosure relates to a tiptoe position estimating device that estimates a tiptoe position of a person seated on a seat of a vehicle and a fingertip position estimating device that estimates a fingertip position of a hand of a person seated on a seat of a vehicle.

BACKGROUND DISCUSSION

As a technique related to a tiptoe position estimating device and a fingertip position estimating device, JP 2018-116397A (Reference 1) describes a point that a line segment approximating a hand region is extracted from a range image captured by an imaging device configured as a three-dimensional distance sensor, and a position of a hand in a candidate region is specified using the line segment.

JP 2016-162425A (Reference 2) describes a point that a skeletal posture of a photographer is estimated using three-dimensional image data captured by a camera, with respect to differences in a viewpoint position and a physique of the photographer.

In Reference 2, a device is used for, by using a camera with a head mounted display, recognizing a situation and an action of a user when life action support or on-site work support is performed.

JP 2002-352231A (Reference 3) describes a point that an image of a human body in a detection space is captured by an imaging device equipped with a plurality of cameras, a distance distribution of the human body is measured from the captured image by stereo image processing, three-dimensional coordinates of an entire human body are calculated, and an end point of the human body is output.

In Reference 3, a human body part can be detected without attaching a contact type sensor such as a marker to the human body.

For example, in a passenger vehicle, a person seated on a seat other than a driver seat does not need to maintain a posture toward a front of a vehicle body, and may take any posture.

In particular, in a one-box type vehicle in which a swivel type seat is provided as a seat other than the driver seat, such as, an occupant seated in the swivel type seat is rotated integrally with the seat, so that it becomes possible to have a conversation with an occupant seated on a rear seat.

However, in a room of the vehicle, for example, when an occupant seated on the swivel type seat is rotated integrally with the seat, it is assumed that a tiptoe of a foot or a fingertip of a hand comes into contact with an instrument in the vehicle, an inner wall, an adjacent seat, or the like, and a technique of estimating a tiptoe position of the foot and a fingertip position of the hand of a person in the vehicle is required.

With respect to such a problem, in the technique in Reference 1, it is necessary to detect a candidate region including the hand from a distance image and specify the position of the hand based on an angle between two adjacent line segments, in order to specify a position of the hand.

In order to specify the position of the hand in such processing, it is necessary for the hand included in a captured image to be clear, and a device capable of high-speed processing is required to process information of a large number of pixels, which leads to an increase in cost.

Further, in the technique in Reference 2, since it is necessary to obtain a skeleton model of a photographer in advance, versatility is low, and it is considered that a tiptoe position of a foot and a fingertip position of a hand of a person seated on a seat in a vehicle is unsuitable for estimation task when acquiring a posture, and the like of the photographer by image processing of a plurality captured images captured at different times.

Further, the technique in Reference 3 enables processing of outputting the end point of the human body, but it requires a plurality of cameras, and further does not perform processing of estimating the tiptoe position of the foot and the fingertip position of the hand of the person in a vehicle, and there is room for improvement.

A need thus exists for a device capable of estimating the tiptoe position of the foot and the fingertip position of the hand of the person in the vehicle.

SUMMARY

A feature configuration of a tiptoe position estimating device according to an aspect of this disclosure includes: a camera configured to capture an image of an interior of a vehicle; and a human body information acquisition unit configured to acquire, from a captured image obtained by capturing an image of a person seated on a seat in the interior by the camera, position information of skeleton points at a plurality of positions of a body of the person, in which the human body information acquisition unit is configured to acquire thigh information which is position information of a skeleton point of a thigh of the person, and lower leg information which is position information of a skeleton point of a lower leg of the person, and the human body information acquisition unit includes a tiptoe position estimating part configured to estimate a tiptoe position of a foot of the person based on the acquired thigh information and the acquired lower leg information.

A feature configuration of a fingertip position estimating device according to an aspect of this disclosure includes: a camera configured to capture an image of an interior of a vehicle; and a human body information acquisition unit configured to acquire, from a captured image obtained by capturing an image of a person seated on a seat in the interior by the camera, position information of skeleton points at a plurality of positions of a body of the person, in which the human body information acquisition unit is configured to acquire forearm information which is position information of a skeleton point of a forearm of the person, and the human body information acquisition unit includes a fingertip position estimating part configured to estimate a fingertip position of a hand of the person based on the acquired forearm information.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

[Overall Configuration]

Figure 1:
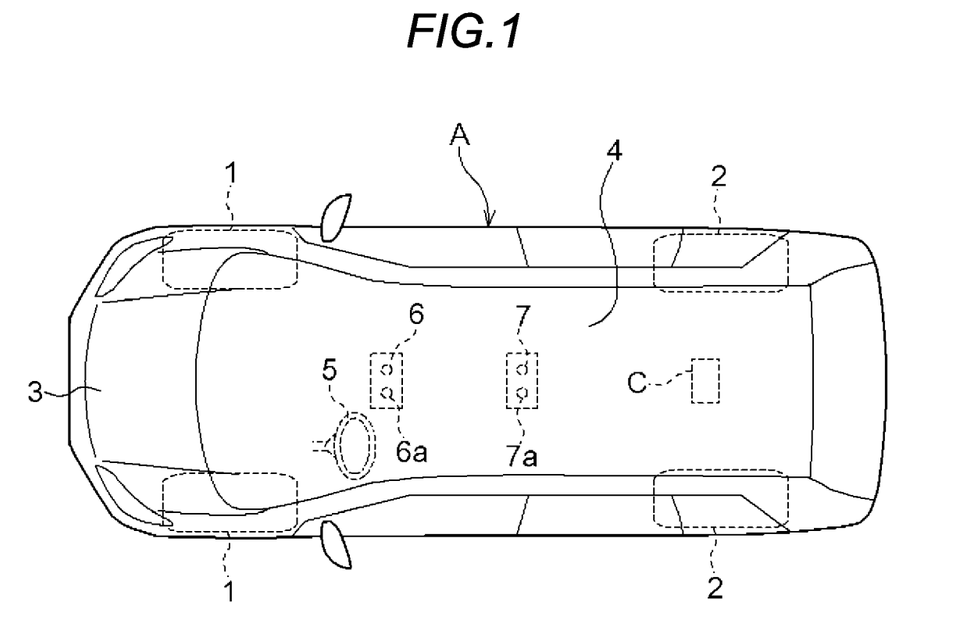
FIG. 1 is a plan view of a passenger vehicle.
Figure 2:
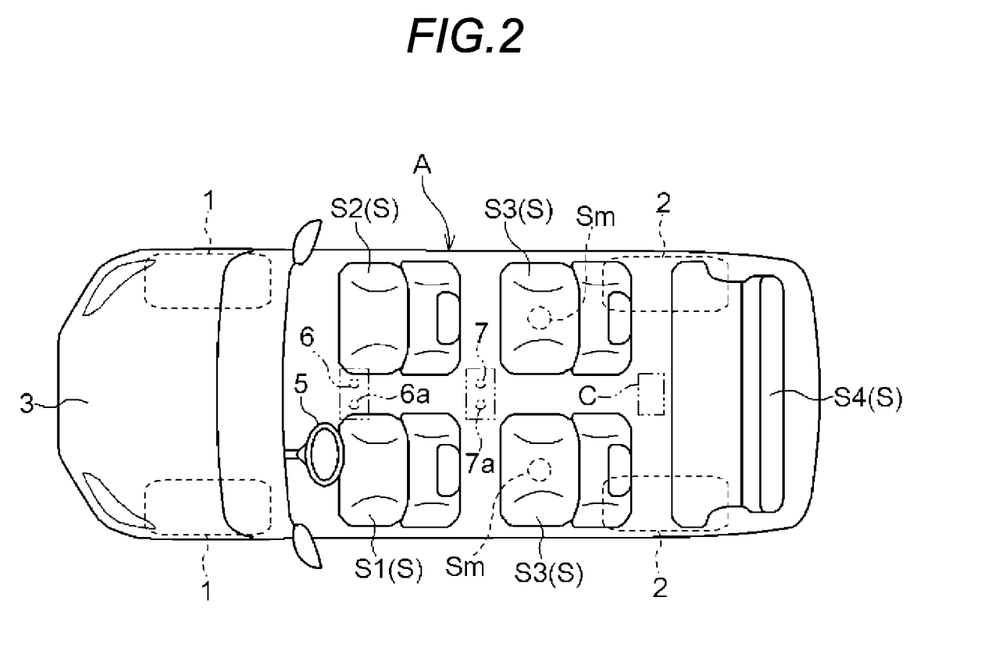
FIG. 2 is a plan view showing an arrangement of seats in the passenger vehicle.

As shown in FIGS. 1 and 2, a passenger vehicle (an example of a vehicle) is configured by arranging an engine bonnet 3 in a front portion of a vehicle body A including a pair of left and right front wheels 1 and a pair of left and right rear wheels 2, and arranging a plurality of seats S (superior concepts of a driver seat S1, an assistant driver seat S2, passenger seats S3, and a bench seat S4 which are described later) in an interior below a roof 4 in a region extending from a center to a rear end of the vehicle body A.

As shown in FIG. 2, the plurality of seats S arranged in the interior are constituted by the driver seat S1 arranged in one side in a left-right direction of a front portion, the assistant driver seat S2 arranged next to the driver seat S1, the passenger seats S3 arranged on left and right of a rear portion, and the bench seat S4 arranged at a rearmost portion.

A steering wheel 5 is arranged on a front side of the driver seat S1. The passenger seats S3 on the left and right are arranged across a central walkthrough, and the passenger seats S3 on the left and right are configured as swivel sheet types that are independently driven and rotated by an electric swivel motor Sm.

Figure 3:
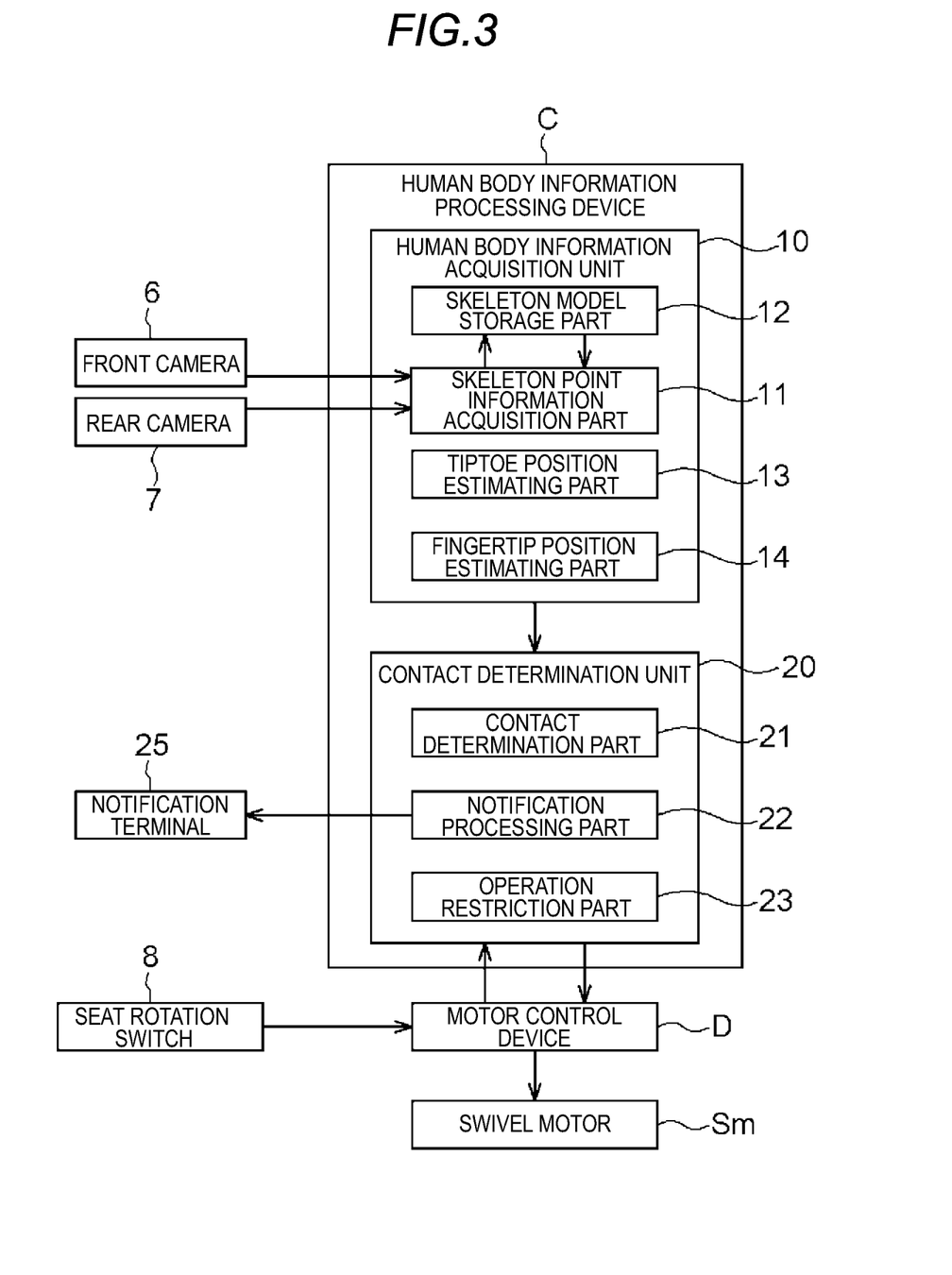
FIG. 3 is a block circuit diagram of a human body information processing device.

As shown in FIG. 3, a motor control device D (see FIG. 3) that controls rotation of the swivel motors Sm on the left and right is provided in the vehicle body A, and the motor control device D outputs a control signal to the swivel motor Sm by artificially operating a seat rotation switch 8 to realize rotation and stop of the passenger seat S3. Further, the vehicle body A is provided with the swivel motors Sm on the left and right and a pair of seat rotation switches 8 corresponding thereto. FIG. 3 shows one swivel motor Sm and one seat rotation switch 8 (a control form of the swivel motor Sm will be described later).

As shown in FIGS. 1 and 2, in the passenger vehicle, a front camera 6 capable of simultaneously capturing an image of persons seated on the driver seat S1 and the assistant driver seat S2, a front lamp 6a that illuminates an image region of the front camera 6 with an infrared ray, a rear camera 7 capable of simultaneously capturing an image of persons seated on the passenger seats S3 on the left and right, and a rear lamp 7a that illuminates an image capturing region of the rear camera 7 with an infrared ray are provided below the roof 4.

Figure 4:
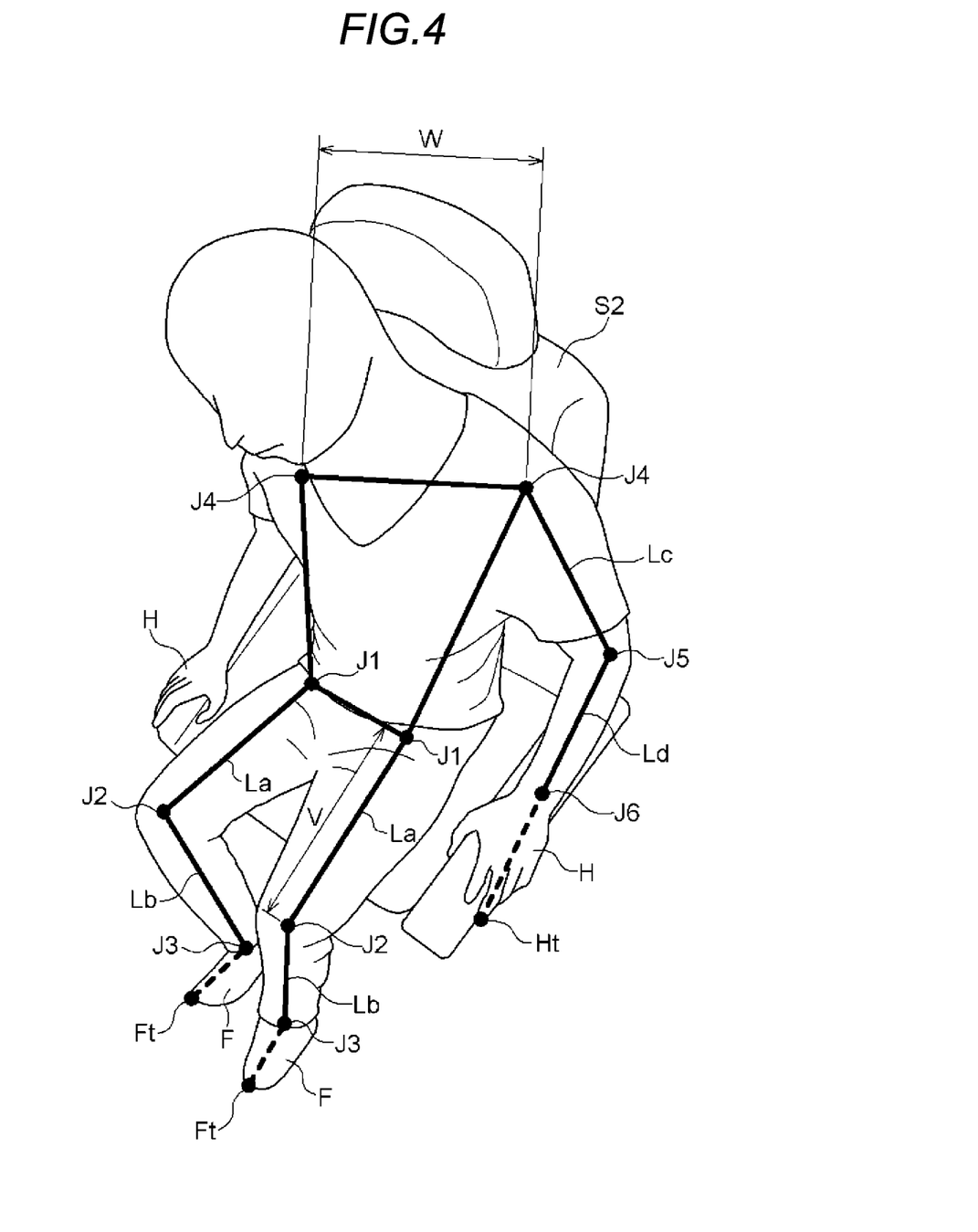
FIG. 4 is a diagram schematically showing a captured image of a person and positions of a plurality of skeleton points of the person.

Further, a human body information processing device C is provided in a rear portion of the vehicle body A. The human body information processing device C determines whether a person is seated on the plurality of seats S based on a captured image of the front camera 6 and a captured image of the rear camera 7, and when a person is seated on the seat S, as shown in FIG. 4, estimates a tiptoe position Ft of a foot F from skeleton points of a lower limb of the captured image, and estimates a fingertip position Ht of a hand H from skeleton points of an upper limb of the captured image. Further, the human body information processing device C is an example of a specific configuration of a tiptoe position estimating device and a fingertip position estimating device.

[Human Body Information Processing Device]

As shown in FIG. 3, the human body information processing device C includes a human body information acquisition unit 10 including software for acquiring the captured image of the front camera 6 and the captured image of the rear camera 7 to acquire human body information, and a contact determination unit 20 including software.

The human body information acquisition unit 10 has a function of acquiring position information of the skeleton points at the plurality of positions of a body of the person seated on the seat S from the captured images of the front camera 6 and the rear camera 7. The human body information acquisition unit 10 includes a skeleton point information acquisition part 11, a skeleton model storage part 12, a tiptoe position estimating part 13, and a fingertip position estimating part 14.

The contact determination unit 20 has a function of determining whether a portion of the human body is likely to come into contact with an inner wall or the like of the vehicle body A when the person seated on the seat S is moved together with the seat S. The contact determination unit 20 includes a contact determination part 21, a notification processing part 22, and an operation restriction part 23.

As shown in FIG. 3, the contact determination unit 20 is configured to acquire a signal from the motor control device D that controls the swivel motor Sm, and to output a control signal to the motor control device D.

[Human Body Information Processing Device: Human Body Information Acquisition Unit]

When the person is included in any of the captured image of the front camera 6 and the captured image of the rear camera 7, the skeleton point information acquisition part 11 acquires position information of skeleton points at the plurality of positions of the body of the person as two-dimensional coordinates (coordinates on an X-Y plane) on the captured image.

FIG. 4 shows an example of the skeleton points at the plurality of positions of the body acquired by the skeleton point information acquisition part 11. In the figure, an image of a person seated on the assistant driver seat S2 is captured by the front camera 6, and the skeleton points (a part is denoted by reference numerals J1 to J6 in FIG. 4) at the plurality of positions are acquired in a state of being superimposed on the image of the person included in the captured image. The skeleton point is a part commonly referred to as a joint in the body, and a skeleton line connecting the plurality of skeleton points with a straight line is shown in the figure.

The skeleton point information acquisition part 11 generates a heat map and a vector map from the captured image by known skeleton point recognition processing, and acquires each of the coordinates of the plurality of joint positions of the human body as the skeleton points by end point grouping processing. For specific skeleton points acquired by the skeleton point information acquisition part 11, as shown in FIG. 4, the coordinates of the skeleton points of the lower limbs on left and right are acquired from a hip joint position J1, a knee joint position J2, and an ankle joint position J3, and the coordinates of the skeleton points of the upper limbs on left and right are acquired from a shoulder joint position J4, an elbow joint position J5, and a wrist joint position J6. Further, in FIG. 4, the joint position of a portion of the upper limb (right side of the human body) is not shown.

The hip joint position J1, the knee joint position J2, the ankle joint position J3, the shoulder joint position J4, the elbow joint position J5, and the wrist joint position J6 are examples of the skeleton points, and the coordinates of the plurality of skeleton points (joint positions) are determined by referring to a skeleton model stored in the skeleton model storage part 12 in skeleton recognition processing in the skeleton point information acquisition part 11. After the coordinates of the plurality of skeleton points are determined in this manner, the skeleton line connecting the plurality of skeleton points is set.

Figure 5:
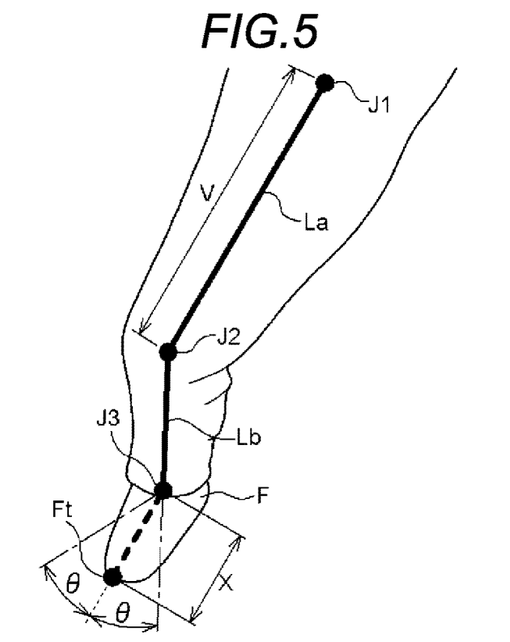
FIG. 5 is a diagram schematically showing positional information of a skeleton point of a lower limb and a foot of a person.
Figure 6:
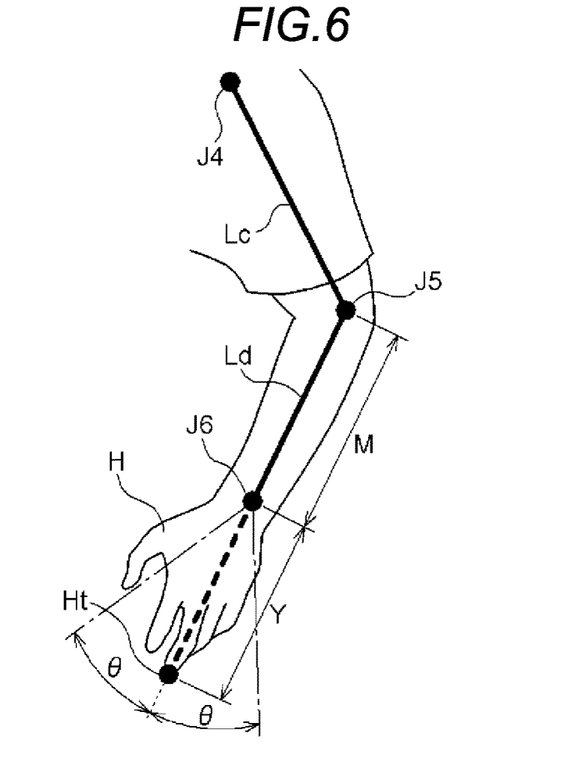
FIG. 6 is a diagram schematically showing positional information of a skeleton point of an upper limb and a hand of a person.

As shown in FIGS. 4 to 6, the skeleton lines include thigh lines La each connecting the hip joint position J1 and the knee joint position J2 with a straight line, and lower leg lines Lb each connecting the knee joint position J2 and the ankle joint position J3 with a straight line. Further, the skeleton lines includes an upper arm line Lc connecting the shoulder joint position J4 and the elbow joint position J5 with a straight line, and a forearm line Ld connecting the elbow joint position J5 and the wrist joint position J6 with a straight line.

In this processing, information on the coordinates of the hip joint position J1 and the knee joint position J2 is referred to as thigh information, and information on the coordinates of the ankle joint position J3 is referred to as lower leg information.

Information on the elbow joint position J5 and the wrist joint position J6 is referred to as the forearm information.

Further, the skeleton point information acquisition part 11 acquires and updates the coordinates of the plurality of skeleton points at the same rate as a frame rate of a moving image including the captured images continuously captured by the front camera 6 or the rear camera 7, and also acquires and updates the thigh line La, the upper arm line Lc, and the like at a set interval.

Although the skeleton point information acquisition part 11 acquires the coordinates of the ankle joint position J3 and the coordinates of the wrist joint position J6 as described above, for the skeleton points of the tiptoe and the fingertip, the coordinates at the tiptoe and the fingertip cannot be acquired by the known skeleton point recognition processing, so that the human body information processing device C includes the tiptoe position estimating part 13 that estimates a coordinates of the tiptoe position Ft and the fingertip position estimating part 14 that estimates a coordinates of a fingertip position Ht.

[Human Body Information Acquisition Unit: Tiptoe Position Estimating Part]

As shown in FIG. 5, the tiptoe position estimating part 13 acquires, as information on a thigh length V (length of thigh line La), a distance (distance between the skeleton points) between the hip joint position J1 and the knee joint position J2 based on the position information (coordinates) of the hip joint position J1 and the position information (coordinates) of the knee joint position J2 which serve as the thigh information. Further, the tiptoe position estimating part 13 acquires the coordinates of the ankle joint position J3 as the lower leg information, sets a foot length X proportional to the thigh length V, and estimates, as the tiptoe position Ft, a position (coordinates) separated by the foot length X based on the coordinates of the ankle joint position J3. In the drawings, a direction along the foot length X is indicated by a broken line in the foot F.

In specific processing of estimating the coordinates of the tiptoe position Ft, a proportional constant is calculated from the relationship between a physique of the person and the thigh length V, the foot length X is obtained by multiplying the thigh length V by the proportional constant (for example, 0.5), and a position separated from the ankle joint position J3 by the foot length X in the direction (direction parallel to the thigh line La) along the thigh is estimated as the tiptoe position Ft. For the physique of the person, for example, a distance between the coordinates of the shoulder joint positions J4 (skeleton points) on left and right of the person acquired by the skeleton point information acquisition part 11 is acquired as a shoulder length W in a horizontal width direction of the human body. Then, the proportional constant is calculated based on the shoulder length W and the thigh length V.

As described above, the tiptoe position estimating part 13 estimates, as the tiptoe position Ft, a position separated from the ankle joint position J3 by the foot length X in the direction (direction parallel to the thigh line La) along the thigh. This is because an extending direction of the foot F of the seated person is often parallel to the thigh line La. Although the tiptoe position Ft set in this manner indicates the tiptoe position Ft extending in the direction along the thigh based on the ankle joint position J3, it is also possible to change the extending direction of the foot F from the direction parallel to the thigh line La to left and right.

For this reason, as shown in FIG. 5, the tiptoe position estimating part 13 sets, as an angle range, a region in which the extending direction of the foot F set in parallel to the thigh line La based on the ankle joint position J3 is laterally expanded from the parallel by an angle A, and estimates the coordinates included in the angle range as the position of the tiptoe position Ft.

[Human Body Information Acquisition Unit: Fingertip Position Estimating Part]

As shown in FIG. 6, the fingertip position estimating part 14 acquires position information (coordinates) of the elbow joint position J5 and position information (coordinates) of the wrist joint position J6, which serve as the forearm information, as information on a forearm length M (length of the forearm line Ld). Further, the fingertip position estimating part 14 sets a hand length Y proportional to the forearm length M, and estimates, as the fingertip position Ht, a position (coordinates) separated by the hand length Y based on the coordinates of the wrist joint position J6. In the drawing, a direction along the hand length Y is indicated by a broken line in the hand H.

In processing of estimating the coordinates of the fingertip position Ht, a proportional constant is calculated from the relationship between the physique of the person and the forearm length M, the hand length Y is obtained by multiplying the forearm length M by a proportional constant (for example, 0.3), and a position separated from the wrist joint position J6 by the hand length Y in a direction (parallel (extended) to the forearm line Ld) along the forearm is estimated as the fingertip position Ht.

For the physique of the person, for example, the distance between the coordinates of the shoulder joint positions J4 (skeleton points) on the left and right of the person acquired by the skeleton point information acquisition part 11 is acquired as the shoulder length W in the horizontal width direction of the human body. Then, the proportional constant is calculated based on the shoulder length W and the forearm length M.

As described above, the fingertip position estimating part 14 estimates, as the fingertip position Ht, a position separated from the wrist joint position J6 by the hand length Y in the direction (direction parallel (extended) to the forearm line Ld) along the forearm. This is because the extending direction of the hand H of the person is often parallel to the forearm line Ld. Although the fingertip position Ht set in this manner indicates the fingertip position Ht extending in the direction along the forearm with based on the wrist joint position J6, it is also possible to change the extending direction of the hand H from the direction parallel to the forearm line Ld to the left and right.

For this reason, as shown in FIG. 6, the fingertip position estimating part 14 sets, as an angle range, a region in which the extending direction of the hand H set in parallel to the forearm line Ld based on the wrist joint position J6 is laterally expanded from the parallel by the angle θ, and estimates the coordinates included in the angle range as the position of the tiptoe position Ft.

[Human Body Information Processing Device: Contact Determination Unit]

The contact determination part 21 acquires the coordinates of the tiptoe position Ft estimated by the tiptoe position estimating part 13 and the coordinates of the fingertip position Ht estimated by the fingertip position estimating part 14, and determines whether at least one of the tiptoe position Ft and the fingertip position Ht is likely to come into contact with a wall portion of the vehicle or a part of the adjacent passenger seat S3, for example.

When it is determined (predicted) by the contact determination part 21 that a contact is made, the notification processing part 22 outputs alarm information before the contact via a notification terminal 25. As the notification terminal 25, a display that displays information, or a lamp is used in addition to a speaker that emits sound, a buzzer or the like.

When it is determined by the contact determination part 21 that the contact is made, the operation restriction part 23 reduces a rotation speed of the swivel motor Sm, and outputs a control signal for stopping swivel of the swivel motor Sm immediately before a contact state is reached.

[Control Form]

Figure 7:
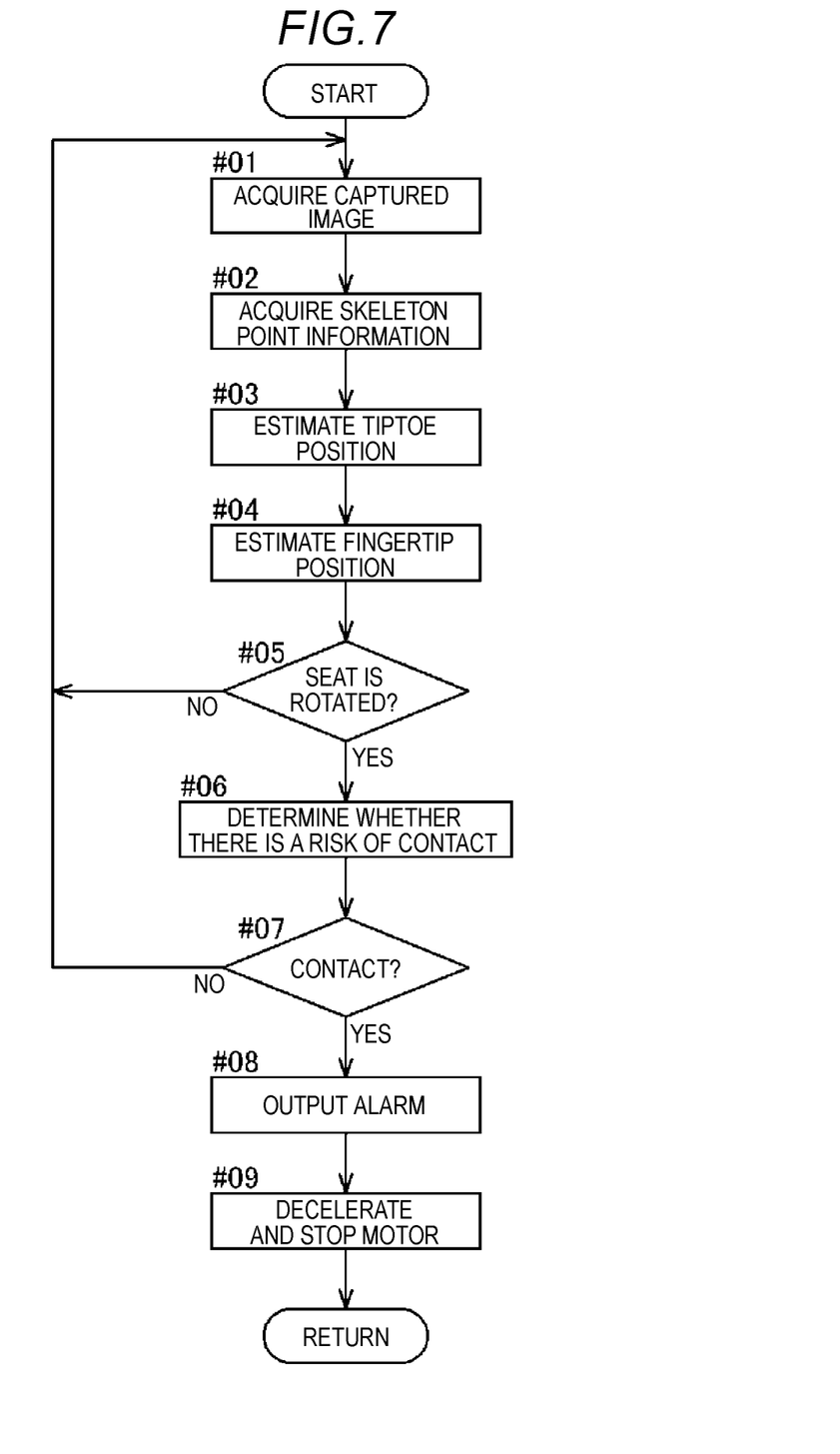
FIG. 7 is a flowchart showing an outline of control.

A control form by the human body information processing device C is shown in a flowchart in FIG. 7. In this control, the skeleton point information acquisition part 11 of the human body information acquisition unit 10 acquires the skeleton point information of the person seated on the seat S by acquiring the captured images from the front camera 6 and the rear camera 7 (steps #01 and #02).

The skeleton point information acquisition part 11 acquires the skeleton point information in a form in which a plurality of joint positions as shown in FIGS. 4 to 6 are two-dimensional coordinates, and obtains the thigh length V, the forearm length M, and the shoulder length W from the acquired coordinates of the plurality of joint positions.

Next, the tiptoe position estimating part 13 estimates the tiptoe position Ft, and the fingertip position estimating part 14 estimates the fingertip position Ht (steps #03 and #04).

In step #03, the tiptoe position estimating part 13 calculates the foot length X by multiplying the thigh length V (the length of the thigh line La) by the proportional constant set based on the shoulder length W as described above, and estimates the coordinates of the tiptoe position Ft separated by the foot length X based on the coordinates of the ankle joint position J3.

Further, the tiptoe position estimating part 13 sets, as the tiptoe position Ft as shown in FIG. 5, the coordinates of the angle range expanded in a lateral direction by the angle θ set based on the ankle joint position J3.

In step #04, the fingertip position estimating part 14 calculates the hand length Y by multiplying the forearm length W (the length of the forearm line Ld) by the proportional constant set based on the shoulder length W as described above, and estimates the coordinates of the fingertip position Ht separated by the hand length Y based on the coordinates of the wrist joint position J6.

Further, the fingertip position estimating part 14 sets, as the fingertip position Ht as shown in FIG. 6, the coordinates of the angle range expanded in the lateral direction by the angle θ set based on the wrist joint position J6.

Next, in a case where the swivel motor Sm is operated by an operation of the seat rotation switch 8 and the passenger seat S3 starts to be rotated, when a person is seated on the passenger seat S3, a rotation trajectory of the estimated tiptoe position Ft and the estimated fingertip position Ht are obtained, and it is determined whether, for example, the tiptoe position Ft is likely to come into contact with the seat of the adjacent passenger seat S3 or a frame at a base end (step #06).

Presence or absence of such a risk of contact is determined not only for the tiptoe position Ft but also for the fingertip position Ht, and the presence or absence of the risk of contact within the range of the angle θ is determined as described above.

Although the tiptoe position Ft and the fingertip position Ht are estimated as two-dimensional coordinates based on the captured image, an image capturing range is determined regardless of the captured image captured by either the front camera 6 or the rear camera 7, and the position of the passenger seat S3 and the position of the skeleton of the person in the captured image have a fixed relationship. Therefore, it is possible to specify the region where the tiptoe position Ft and the fingertip position Ht are moved when the passenger seat S3 is rotated, and it is possible to determine whether there is a risk of contact from the specified region.

Then, when the contact is not predicted, the processing of steps #01 to #06 are repeated, whereas when the contact is predicted, the alarm information is output to the notification terminal 25 before the contact state is reached, a swivel speed of the swivel motor Sm is reduced, and further, even when the seat rotation switch 8 is operated, processing for stopping the swivel motor Sm is performed immediately before the contact (steps #07 to #09).

Effect of Embodiment

As described above, regardless of whether the image of the person is captured by either the front camera 6 or the rear camera 7, even when the image of the feet or the hand of the person in the captured image is not clear, in a state where the person is seated on the seat S, in the human body information processing device C, the skeleton point information acquisition part 11 acquires the coordinates of the plurality of skeleton points, the tiptoe position estimating part 13 properly estimates the coordinates of the tiptoe position Ft, and the fingertip position estimating part 14 properly estimates the coordinates of the fingertip position Ht.

Since a direction toward the tiptoe position Ft and a direction toward the fingertip position Ht are estimated within predetermined angle ranges, a region where the tiptoe position Ft and the fingertip position Ht exist can be properly estimated even when a posture of the foot F and a posture of the hand H are out of reference postures.

Since the coordinates of the tiptoe position Ft and the coordinates of the finger position Ht are acquired at the same interval as the frame rate of the moving image including the captured images continuously captured by the front camera 6 or the rear camera 7, the estimated coordinates are updated even when the person changes his or her posture, for example, when the person is rotated integrally with the seat S, such as when the passenger seat S3 is rotated, the contact determination unit 20 outputs the alarm information to the notification terminal 25 when the contact with the person at either the tiptoe position Ft or the fingertip position Ht is predicted to alert the occupant, and the rotation of the passenger seat S3 is stopped to avoid contact.

In particular, since when the passenger seat S3 is rotated, the plurality of skeleton points are acquired, and the coordinates of the tiptoe position Ft and the coordinates of the fingertip position Ht are estimated, after confirming output of the alarm information, the output of the alarm information is stopped by moving the tiptoe position Ft or the fingertip position Ht to a position where the contact is avoided, and the rotation of the passenger seat S3 continues.

The human body information processing device C sets the coordinates of the plurality of joint positions as the skeleton point information on the two-dimensional plane that can be superimposed on the captured image, generates the skeleton lines such as the thigh line La and the upper arm line Lc, and further, generates the coordinates of the tiptoe position Ft and the coordinates of the fingertip position Ht from the skeleton point information on the two-dimensional plane, thus high-speed processing is possible as compared with a case where the coordinates are set in a three-dimensional space.

Another Embodiment

This disclosure may be configured as follows in addition to the embodiment described above (those having the same functions as those in the embodiment are denoted by the same reference numerals and signs as those in the embodiment).

(a) In the embodiment, the proportional constant is set based on a distance between coordinates of the shoulder joint positions J4 on left and right as the shoulder length W in the horizontal width direction of the human body, but instead of this, it is also possible to acquire a distance between the hip joint positions J1 as skeleton points on the left and right of the waist is as a waist length, calculate a proportional constant based on the waist length and the thigh length V, and set a processing form so as to set the foot length X based on the proportional constant. Accordingly, the foot length X corresponding to a physique of a person is set, and accuracy of an estimated position of the tiptoe position Ft is improved.

(b) It is also possible to set a proportional constant based on the shoulder length W and a waist length, such as setting the proportional constant based on a value obtained by adding the shoulder length W described in the embodiment and the waist length described in the other embodiment (a), or an average value of the shoulder length W and the waist length. By setting the proportional constant in this manner, accuracy of the estimated position of the tiptoe position Ft corresponding to a height of a person seated on the seat S can be improved.

(c) For example, the human body information processing device C having the configuration described in the embodiment can be provided in a vehicle configured to travel automatically toward a destination by recognizing a positional relationship between a lane and surrounding vehicles based on image information from an external camera and information on an outside of the vehicle detected by a sensor and automatically performing steering operation and accelerator operation.

In a vehicle capable of automatic driving configured as in another embodiment (c), a person (driver) seated on the driver seat S1 does not need to operate the steering wheel 5 at all times, the driver seat S1 can be largely moved backward when traveling by automatic driving, or the assistant driver seat S2 can be configured as a swivel type seat so that a person seated on the assistant driver seat S2 is rotated together with the assistant driver seat S2.

By providing the human body information processing device C in the vehicle capable of automatic driving, even when the person is moved or rotated with the seat S, when the tiptoe position Ft or the fingertip position Ht is presumed to come into contact with a wall portion in the vehicle or a portion of the adjacent seat S, it is possible to avoid the contact by outputting alarm information and stopping driving of the seat S.

(d) Based on the tiptoe position Ft estimated by the human body information processing device C, one of a brake pedal and an accelerator pedal that is being operated is displayed on a display or output as a voice message. With such a configuration, it is possible to notify a driver of a pedal depression error.

(e) A change in the coordinates of the tiptoe position Ft and the coordinates of the fingertip position Ht which are estimated by the human body information processing device C is stored with time, and for example, the stored coordinates are displayed on the display, so that it is also possible to confirm operation performed by the person in the vehicle.

This disclosure can be used in a device that estimates a tiptoe position or a fingertip position of a person seated on a seat of a vehicle from a captured image.

A feature configuration of a tiptoe position estimating device according to an aspect of this disclosure includes: a camera configured to capture an image of an interior of a vehicle; and a human body information acquisition unit configured to acquire, from a captured image obtained by capturing an image of a person seated on a seat in the interior by the camera, position information of skeleton points at a plurality of positions of a body of the person, in which the human body information acquisition unit is configured to acquire thigh information which is position information of a skeleton point of a thigh of the person, and lower leg information which is position information of a skeleton point of a lower leg of the person, and the human body information acquisition unit includes a tiptoe position estimating part configured to estimate a tiptoe position of a foot of the person based on the acquired thigh information and the acquired lower leg information.

According to the feature configuration, the human body information acquisition unit is configured to acquire, from the captured image obtained by the camera, the thigh information which is the position information of the skeleton point of the thigh of the person seated on the seat in the interior of the vehicle, and the lower leg information which is the position information of the skeleton point of the lower leg. Based on the thigh information and the lower leg information, the tiptoe position estimating part estimates the tiptoe position of the foot of the person seated on the seat. That is, in the human body information acquisition unit, even with a single camera, a thigh and a lower leg are identified from the captured image to acquire the thigh information and the lower leg information, and further, the tiptoe position of the foot is estimated based on these pieces of information, so that even when the skeleton point of the tiptoe cannot be acquired, the tiptoe position can be grasped by estimation.

Therefore, a device that estimates a tiptoe position of a foot of a person in a vehicle is configured.

As a configuration in addition to the above configuration, the human body information acquisition unit may acquire, as the thigh information, coordinates of a skeleton point at a hip joint position and a skeleton point at a knee joint position in the captured image and a thigh length which is a distance between the skeleton point at the hip joint position and the skeleton point at the knee joint position, and acquire, as the lower leg information, coordinates of a skeleton point at an ankle joint position, and the tiptoe position estimating part may set a foot length of the foot in a relationship proportional to the thigh length, and estimate, as the tiptoe position, a position separated by the foot length based on the coordinates of the skeleton point at the ankle joint position.

In this configuration, the thigh length can be acquired from the coordinates of the skeleton point at the hip joint position and the skeleton point at the knee joint position which are acquired by the human body information acquisition unit, and the foot length of the foot in a relationship proportional to the thigh length can be set. The position separated by the foot length based on the coordinates of the skeleton point at the ankle joint position acquired by the human body information acquisition unit can be estimated as the tiptoe position.

As a configuration in addition to the above configuration, the human body information acquisition unit may acquire coordinates of skeleton points of shoulders on left and right and/or skeleton points on left and right of a waist of the person in the captured image, and acquire a shoulder length and/or a waist length which is a distance between the skeleton points of the shoulders on left and right and/or the skeleton points on left and right of the waist, and the tiptoe position estimating part may calculate a proportional constant based on the acquired shoulder length and/or the waist length and the thigh length, and set the foot length from the thigh length based on the proportional constant.

According to this, for example, the distance between the skeleton points of the shoulders on left and right of the person can be acquired as the shoulder length, the distance between the skeleton points on left and right of the waist of the person can be acquired as the waist length, the proportional constant can be calculated based on at least one of the acquired shoulder length and the acquired waist length, and the foot length can be set from the thigh length based on the proportional constant. That is, a dimensional relationship of a skeleton of the human body can be considered to be proportional, and for example, the foot length is set by an operation of multiplying the thigh length by the proportional constant calculated from the shoulder length acquired from the captured image, so that it is possible to improve accuracy of the tiptoe position.

As a configuration in addition to the above configuration, the tiptoe position estimating part may acquire a direction along the thigh from the coordinates of the skeleton point at the hip joint position and the skeleton point at the knee joint position of the thigh, set a relative posture in which the direction along the thigh is parallel to a direction from the coordinates of the skeleton point at the ankle joint position of the foot toward the tiptoe position as a reference posture of the foot, and estimate the tiptoe position within a predetermined angle range from the reference posture.

According to this, since it is possible to estimate the direction (extending direction of the foot) from the coordinates of the skeleton point at the ankle joint position toward the tiptoe position within the predetermined angle range, a region where the tiptoe exists can be estimated even when the foot is out of the reference posture.

A feature configuration of a fingertip position estimating device according to an aspect of this disclosure includes: a camera configured to capture an image of an interior of a vehicle; and a human body information acquisition unit configured to acquire, from a captured image obtained by capturing an image of a person seated on a seat in the interior by the camera, position information of skeleton points at a plurality of positions of a body of the person, in which the human body information acquisition unit is configured to acquire forearm information which is position information of a skeleton point of a forearm of the person, and the human body information acquisition unit includes a fingertip position estimating part configured to estimate a fingertip position of a hand of the person based on the acquired forearm information.

According to the feature configuration, the human body information acquisition unit is configured to acquire, from the captured image obtained by the camera, the forearm information, which is the position information of the skeleton point of the forearm of the person seated on the seat in the interior of the vehicle. Based on the forearm information, the fingertip position estimating part estimates the fingertip position of the hand of the person seated on the seat. That is, in the human body information acquisition unit, even with a single camera, a forearm is identified from the captured image to acquire the forearm information, and further, the fingertip position of the hand is estimated based on these pieces of information, so that even when the skeleton point of the fingertip cannot be acquired, the tiptoe position can be grasped by estimation.

Therefore, a device that estimates a fingertip position of a hand of a person in a vehicle is configured.

As a configuration in addition to the above configuration, the human body information acquisition unit may acquire, as the forearm information, coordinates of a skeleton point at an elbow joint position and a skeleton point at a wrist joint position in the captured image and a forearm length which is a distance between the skeleton point at the elbow joint position and the skeleton point at the wrist joint position, and the fingertip position estimating part may set a hand length of the hand in a relationship proportional to the forearm length and estimate, as the fingertip position, a position separated by the hand length based on the coordinates of the skeleton point at the wrist joint position.

In this configuration, the forearm length can be acquired from the coordinates of the skeleton point at the elbow joint position and the skeleton point at the wrist joint position which are acquired by the human body information acquisition unit, and the hand length of the hand in a relationship proportional to the forearm length can be set. The position separated by the hand length based on the coordinates of the skeleton point at the wrist joint position acquired by the human body information acquisition unit can be estimated as the fingertip position.

As a configuration in addition to the above configuration, the human body information acquisition unit may acquire coordinates of skeleton points of shoulders on left and right and/or skeleton points on left and right of a waist of the person in the captured image, and acquire a shoulder length and/or a waist length which is a distance between the skeleton points of the shoulders on left and right and/or the skeleton points on left and right of the waist, and the fingertip position estimating part may calculate a proportional constant based on the acquired shoulder length and/or the waist length and the forearm length, and set the hand length from the forearm length based on the proportional constant.

According to this, for example, the distance between the skeleton points of the shoulders on left and right of the person can be acquired as the shoulder length, the distance between the skeleton points on left and right of the waist of the person can be acquired as the waist length, the proportional constant can be calculated based on at least one of the acquired shoulder length and the acquired waist length, and the hand length can be set from the forearm length based on the proportional constant. That is, a dimensional relationship of a skeleton of the human body can be considered to be proportional, and for example, the hand length is set by an operation of multiplying the forearm length by the proportional constant calculated from the shoulder length acquired from the captured image, so that it is possible to improve accuracy of the fingertip position.

As a configuration in addition to the above configuration, the fingertip position estimating part may acquire a direction along the forearm from the coordinates of the skeleton point at the elbow joint position and the skeleton point at the wrist joint position of the forearm, set a relative posture in which the direction along the forearm is parallel to a direction from the coordinates of the skeleton point at the wrist joint position of the hand toward the fingertip position as a reference posture of the hand, and estimate the fingertip position within a predetermined angle range from the reference posture.

According to this, since it is possible to estimate the direction (extending direction of the hand) from the coordinates of the skeleton point at the wrist joint position toward the fingertip position within the predetermined angle range, a region where the fingertip exists can be estimated even when the hand is out of the reference posture.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A tiptoe position estimating device, comprising:
   a camera configured to capture an image of an interior of a vehicle; and
   a human body information acquisition unit configured to acquire, from a captured image obtained by capturing an image of a person seated on a seat in the interior by the camera, position information of skeleton points at a plurality of positions of a body of the person, the position information including coordinates of a plurality of joint positions of the body as the skeleton points by image processing wherein
   the human body information acquisition unit is configured to acquire thigh information which is position information of a skeleton point of a thigh of the person from the captured image, and lower leg information which is position information of a skeleton point of a lower leg of the person from the captured image, and
   the human body information acquisition unit includes a tiptoe position estimating part configured to estimate a tiptoe position of a foot of the person based on the acquired thigh information and the acquired lower leg information, the tiptoe position being coordinates separated by a foot length from coordinates of a skeleton point at an ankle joint position.

2. The tiptoe position estimating device according to claim 1, wherein
   the human body information acquisition unit is configured to acquire, as the thigh information, coordinates of a skeleton point at a hip joint position and a skeleton point at a knee joint position in the captured image and a thigh length which is a distance between the skeleton point at the hip joint position and the skeleton point at the knee joint position, and acquire, as the lower leg information, the coordinates of the skeleton point at the ankle joint position, and
   the tiptoe position estimating part is configured to set the foot length of the foot in a relationship proportional to the thigh length.

3. The tiptoe position estimating device according to claim 2, wherein
   the human body information acquisition unit is configured to acquire coordinates of skeleton points of shoulders on left and right and/or skeleton points on left and right of a waist of the person in the captured image, and acquire a shoulder length and/or a waist length which is a distance between the skeleton points of the shoulders on left and right and/or the skeleton points on left and right of the waist, and
   the tiptoe position estimating part is configured to calculate a proportional constant based on the acquired shoulder length and/or the waist length and the thigh length, and set the foot length from the thigh length based on the proportional constant.

4. The tiptoe position estimating device according to claim 2, wherein
   the tiptoe position estimating part is configured to acquire a direction along the thigh from the coordinates of the skeleton point at the hip joint position and the skeleton point at the knee joint position of the thigh, set a relative posture in which the direction along the thigh is parallel to a direction from the coordinates of the skeleton point at the ankle joint position of the foot toward the tiptoe position as a reference posture of the foot, and estimate the tiptoe position within a predetermined angle range from the reference posture.

* * * * *